(12) United States Patent
Dabdoub

(10) Patent No.: US 8,101,700 B2
(45) Date of Patent: Jan. 24, 2012

(54) PHOSPHONIC POLYMERS HAVING A PHOSPHINATE BACKBONE AND METHODS OF MAKING AND USING THEREOF

(75) Inventor: Atif M. Dabdoub, Atlanta, GA (US)

(73) Assignee: Unichem Technologies, Inc., Atlanta, GA (US)

( * ) Notice: Subject to any disclaimer, the term of this patent is extended or adjusted under 35 U.S.C. 154(b) by 425 days.

(21) Appl. No.: 12/347,025

(22) Filed: Dec. 31, 2008

(65) Prior Publication Data

US 2010/0168361 A1 Jul. 1, 2010

(51) Int. Cl.
*C08F 30/02* (2006.01)

(52) U.S. Cl. ........ 526/274; 526/277; 526/278; 528/392; 528/398

(58) Field of Classification Search .................. 526/274, 526/277, 278; 528/392, 398
See application file for complete search history.

(56) References Cited

U.S. PATENT DOCUMENTS

| | | | |
|---|---|---|---|
| 2,365,466 A | 12/1944 | Hamilton | |
| 2,632,768 A | 3/1953 | Coover, Jr. et al. | |
| 3,613,788 A | 10/1971 | Kautsky | |
| 3,619,427 A | 11/1971 | Kautsky | |
| 3,641,202 A | 2/1972 | Biranowski et al. | |
| 3,738,937 A | 6/1973 | Kautsky | |
| 3,837,803 A | 9/1974 | Carter et al. | |
| 3,887,340 A | 6/1975 | Hsu et al. | |
| 4,046,707 A | 9/1977 | Smith et al. | |
| 4,132,526 A | 1/1979 | Schwarz et al. | |
| 4,190,615 A | 2/1980 | Becker | |
| 4,201,669 A | 5/1980 | Becker et al. | |
| 4,237,005 A | 12/1980 | Becker | |
| 4,267,125 A | 5/1981 | Dursch et al. | |
| 4,342,733 A | 8/1982 | Steelhammer et al. | |
| 4,387,027 A | 6/1983 | May et al. | |
| 4,409,192 A | 10/1983 | Lichtner et al. | |
| 4,446,028 A | 5/1984 | Becker | |
| 4,446,046 A | 5/1984 | Becker | |
| 4,681,686 A | 7/1987 | Richardson et al. | |
| 4,900,451 A | 2/1990 | Michael et al. | |
| 4,997,523 A | 3/1991 | Pease et al. | |
| 5,180,498 A | 1/1993 | Chen et al. | |
| 5,256,808 A | 10/1993 | Alexandratos | |
| 5,281,631 A | 1/1994 | Horwitz et al. | |
| 5,350,536 A | 9/1994 | Chen et al. | |
| 5,376,731 A | 12/1994 | Kerr et al. | |
| 5,519,102 A | 5/1996 | Cady et al. | |
| 5,582,737 A | 12/1996 | Gula et al. | |
| 5,596,130 A | 1/1997 | Wright et al. | |
| 5,854,080 A | 12/1998 | Harvey | |
| 7,420,081 B2 | 9/2008 | Dabdoub | |
| 7,442,831 B2 * | 10/2008 | Dabdoub | 562/8 |

OTHER PUBLICATIONS

Ohms et al., "Synthesis and 31P and 13C NMR Studies of Pyrophosphonic Acids", Phosphorus, Sulfur, and Silicon, 1992, vol. 68, pp. 77-89.
Patent abstract of Japan and machine generated English translation of JP 05-086081, published Jun. 4, 1993.

* cited by examiner

*Primary Examiner* — Edward Cain
(74) *Attorney, Agent, or Firm* — Gardner Groff Greenwald & Villanueva, P.C.

(57) ABSTRACT

Described herein are new phosphonic polymers and methods of making and using the same. The polymers are prepared by the polymerization of phosphonic acid monomers with hypophosphorous acid, an alkali metal hypophosphite, an alkyl substituted hypophosphite, or any combination thereof. The resultant polymers have pendant phosphonate groups attached to the polymer backbone as well as phosphinate groups incorporated within the polymer backbone. Additional monomers can be used to produce copolymers, terpolymers, and the like. The polymers described herein have numerous applications with respect to inhibiting scale formation and corrosion in a number of systems.

25 Claims, No Drawings

PHOSPHONIC POLYMERS HAVING A PHOSPHINATE BACKBONE AND METHODS OF MAKING AND USING THEREOF

BACKGROUND

Polyphosphonic acids have numerous applications in industry. For example, polyphosphonic acids can be used as corrosion inhibition agents in cooling water and boiler water systems (U.S. Pat. Nos. 4,446,046 and 4,201,669) and inhibitors of fouling deposit formation on jet engine components during the combustion of finished turbine combustion fuel oils (U.S. Pat. No. 5,596,130). One approach to the synthesis of polyphosphonic acids involves the radical polymerization of unsaturated phosphonic acid monomers (U.S. Pat. Nos. 4,201,669, 4,446,046 and 5,519,102).

An unsaturated phosphonic acid monomer that has received considerable attention is isopropenylphosphonic acid, which has the formula $H_2C=C(CH_3)(PO_3H_2)$, which is referred to herein as "IPPA." The polymerization of IPPA and related monomers results in the formation of a polymer with pendant phosphonate groups. It would be desirable to synthesize polymers not only possessing pendant phospohonate groups but also phosphorous groups within the polymer backbone. These polymers would be useful in a variety of industry applications such as scale and corrosion inhibition in a number of systems. The methods described herein accomplish these goals.

SUMMARY

Described herein are new phosphonic polymers and methods of making and using the same. The polymers are prepared by the polymerization of phosphonic acid monomers with hypophosphorous acid, an alkali metal hypophosphite, an alkyl substituted hypophosphite, or any combination thereof. The resultant polymers have pendant phosphonate groups and phosphinate groups within the polymer backbone. Additional monomers can be used to produce a variety of polymers such as copolymers, terpolymers, and the like. The polymers described herein have numerous applications with respect to inhibiting scale formation and corrosion in a number of systems. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present compounds, compositions, articles, devices, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a pharmaceutical carrier" includes mixtures of two or more such carriers, and the like.

"Optional" or "optionally" means that the subsequently described event or circumstance can or cannot occur, and that the description includes instances where the event or circumstance occurs and instances where it does not. For example, the phrase "optionally substituted aryl group" means that the aryl group can or can not be substituted and that the description includes both an unsubstituted aryl group and an aryl group where there is substitution.

Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Variables such as $R^1$-$R^4$, $R^7$, A, and n used throughout the application are the same variables as previously defined unless stated to the contrary.

The term "alkyl group" as used herein is a branched- or straight-chain saturated hydrocarbon group of 1 to 25 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "heteroalkyl group" is defined as an alkyl group defined above having at least one heteroatom incorporated within the alkyl group. In certain embodiments, one of the hydrogen atoms can be substituted with a group having a heteroatom. For example, the group can be a hydroxyl group (OH) or thiol group (SH). Other examples of groups containing one or more heteroatoms include nitro, amino, ester, carboxylic acid, carbamide, sulfonate, sulfonic acid, alkoxy, or $SO_2R$ or $S(O)_2OR$, where R can be hydrogen or an alkyl group described above. Alternatively, one of the carbon atoms of the alkyl group can be substituted with a heteroatom. Examples of heteroatoms include, but are not limited to, nitrogen, oxygen, sulfur, and phosphorous.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulphur, or phosphorus.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorous. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, sulfonate, sulfonic acid, alkoxy, or $SO_2R$ or $S(O)_2OR$, where R can be hydrogen, an alkali metal, or an alkyl group described above. The aryl group also includes aralkyl such as, for example, benzyl. The aryl group of the aralkyl group can be substituted with one or more groups listed above.

The term "protecting group" as used herein is a group that can be chemically bound to an oxygen atom, and subsequently removed (either chemically, in-vitro, or in-vivo) from the oxygen atom by predictable methods. Examples of many of the possible protective groups can be found in *Protective Groups in Organic Synthesis* by T. W. Green, John Wiley and Sons, 1981, which is incorporated herein by reference in its entirety.

Disclosed are compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of molecules A, B, and C are disclosed as well as a class of molecules D, E, and F and an example of a combination molecule, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

Described herein are methods for producing phosphonic polymers. In one aspect, the polymer is produced by the process comprising polymerizing a monomer comprising the formula I

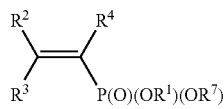

I wherein $R^1$-$R^4$ and $R^7$ comprises, independently, hydrogen, an alkyl group, a cycloalkyl group, a heteroalkyl group, a heterocycloalkyl group, an aryl group, a heteroaryl group, a protecting group, an aryl group substituted with one or more $SO_2R$ or $S(O)_2OR$ groups, where R is hydrogen, an alkali metal, or an alkyl group, or any combination thereof. In other aspects, $R^2$ and $R^4$ form a substituted or unsubstituted cycloalkyl group, with hypophosphorous acid, an alkali metal hypophosphite, an alkyl substituted hypophosphite, or any combination thereof.

The compounds represented in formula I are referred to herein as unsaturated phosphonic compounds. In one aspect, $R^2$ and $R^3$ in formula I can be hydrogen. In another aspect, $R^4$ in formula I can be an aryl group or a heteroaryl group. In another aspect, $R^1$ and $R^7$ in formula I can be hydrogen. In another aspect, the compound having the formula I has the formula $H_2C=C(R^9)(PO_3H_2)$, where $R^9$ can be hydrogen, substituted or unsubstituted phenyl, or substituted or unsubstituted benzyl (e.g., $CH_2C_6H_4$-p-$S(O)_2OH$ or alkali salt thereof such as sodium). Methods for making the unsaturated phosphonic compounds of formula I are disclosed in U.S. Pat. Nos. 7,420,081 and 7,422,831, which are incorporated by reference in their entireties.

In one aspect, the unsaturated phosphonic compound has the formula II

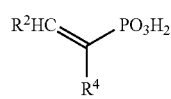

II where $R^2$ and $R^4$ are, independently, hydrogen, an alkyl group, an aryl group, a heteroaryl group, a cycloalkyl group, a heteroalkyl group, a heterocycloalkyl group, a protecting group, or any combination thereof. In certain aspects, compounds having the formula II can be a mixture of monomers and dimers. The compounds having the formula II can be produced from starting materials having the formula III,

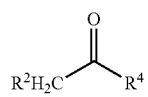

III where $R^2$ and $R^4$ are defined above. In one aspect, the precursor to the unsaturated phosphonic compounds can be the following compounds:

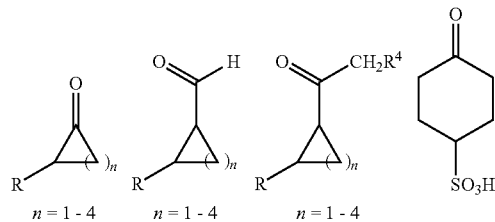

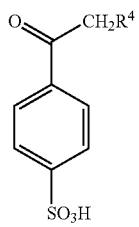

where $R^4$ is defined above and R is hydrogen or an alkyl group. Based on these starting materials, the following unsaturated phosphonic acid compounds having the formula I can be obtained:

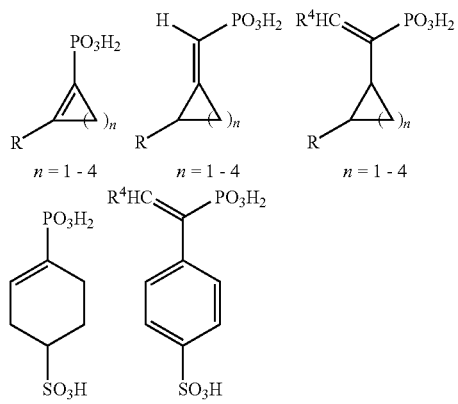

The cyclic groups can be substituted with a variety of groups such as, for example, alkyl, alkenyl, alkynyl, carboxyl, amide, nitro, and the like. For example, the cyclohexyl ring above has a $SO_3H$ group attached to it (or the alkali metal thereof).

Hypophosphorous acid has the formula $H_2P(O)OH$, and the alkali metal hypophosphite and alkyl substituted hypophosphite have the general formula $H_2P(O)OA$, where A is an alkali metal such as lithium, sodium, potassium, rubidium, or cesium, or an alkyl group as defined herein, respectively. The use of hypophosphorous acid, the alkali metal salt thereof, and/or the alkyl substituted hypophosphite increases polymer yields while, at the same time, reduces reaction times. For example, the Examples demonstrate that polymer yields of 90% or higher can be achieved when sodium hypophosphite is used in the polymerization reaction. Conversely, when no hypophosphorous acid and/or alkali metal salt thereof are used, reaction yields are lower (e.g., 62%). The amount of hypophosphorous acid or the alkali metal salt thereof useful herein can vary. In one aspect, the molar ratio of hypophosphorous acid, the alkali metal hypophosphite, or a combination thereof per monomer is from 1:5 to 1:50, 1:5 to 1:40, 1:5 to 1:30, or 1:5 to 1:25.

Techniques for producing the polymers described herein are provided in the Examples. In one aspect, the monomer having the formula I is added to water and the pH of the solution can be maintained at desired pH by the addition of base. In one aspect, the pH is maintained from 3 to 6, preferably 4 to 5. In certain aspects, a mixture of monomer I and dimer IV is added to water, where the dimer is converted to the monomer I in situ. In this aspect, the resulting solution, which is composed of 100% monomer, can then be polymerized as set forth as described herein and in the Examples below.

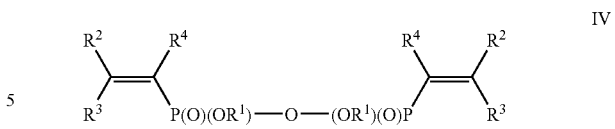

Hypophosphorous acid, the alkali metal hypophosphite, the alkyl substituted hypophosphite, or any combination thereof is then added to the aqueous solution of monomer along with other polymerization catalysts. One or more additional monomers can be added depending upon the desired polymer to be produced. Characterization of the resultant polymer can be readily performed by $^{31}P$ NMR spectroscopy (see Examples).

A variety of different polymers can be produced herein. In general, the polymers have (1) multiple and repeat pendant phosphonate groups attached to the polymer backbone derived from monomer I alone or a mixture of monomer I and dimer IV and (2) multiple and repeat phosphinate groups incorporated within the polymer backbone, which is derived from hypophosphorous acid, the alkali metal hypophosphite, the alkyl substituted hypophosphite, or any combination thereof. Thus, the phosphonate and phosphinate groups are not merely localized at the ends of the polymer but are incorporated throughout the polymer in a consistent (i.e., repeat) manner. This is shown in the general structure V below:

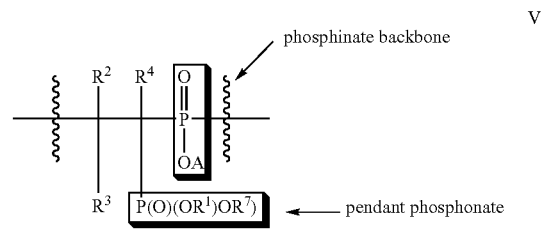

where A is hydrogen, an alkali metal, or an alkyl group. Formula V merely depicts the pendant phosphonate and phosphinate groups incorporated in the polymer backbone, and is not limiting with respect to the structure of polymers described herein. An example of a polymer that is the polymerization product between IPPA and hypophosphorous acid, an alkali metal hypophosphite, or an alkyl substituted hypophosphite is shown in formula VI, where A is hydrogen, an alkali metal, or an alkyl group.

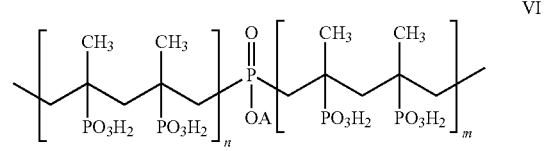

The importance of the pendant phosphonate groups and phosphinate backbone are described below. The polymers can exist as neutral polymers and/or salts thereof depending upon reaction conditions. It is contemplated that the polymers can be capped with phosphonate groups [—$P(O)(OR^1)(OR^7)$] or a phosphinate group [—$P(O)(OA)$], where $R^1$, $R^7$, and A are defined above.

Copolymers and terpolymers can be readily produced. For example, the polymer can be the polymerization product of two or more different monomers having the formula I and hypophosphorous acid, an alkali metal hypophosphite, an alkyl substituted hypophosphite, or any combination thereof. In other aspects, the polymer can be the polymerization product between at least one monomer having the formula I, one or more olefinically unsaturated monomers, and hypophosphorous acid, an alkali metal hypophosphite, an alkyl substituted hypophosphite, or any combination thereof. Examples of olefinically unsaturated monomers include, but are not limited to, acrylic acid, methacrylic acid, acrylamide, t-butylacrylamide, methyl methacrylate, ethyl acrylate, 2-hydroxy ethyl acrylate, 2-hydroxy propyl acrylate, maleic acid, maleic anhydride, vinyl sulfonic acid, 2-acrylamido-2-methyl propane sulfonic acid (AMPS), styrene sulfonic acid or sodium salt thereof, vinyl acetate, styrene acetate, styrene benzoic acid, vinyl cyclopropane, vinyl cyclopentane, sodium vinyl sulfonate, vinyl cyclohexane, or any combination thereof.

The polymers described herein have numerous applications. For example, the polymers described herein can inhibit scale formation, corrosion, or both in a system. The term "inhibit" as used herein means completely preventing scale formation and/or corrosion or reducing the rate of scale formation and/or corrosion. Scale formation is an expensive problem in many industrial systems, causing delays and shutdown for cleaning and removal. Scale formation can also lead to corrosion of system parts as well. In general, scale formation and corrosion are the result of the formation of crystalline deposits on the surface of metallic substrates that are continuously exposed to water over time. The water has one or more minerals that can form crystals on the metal substrate, which can be very difficult to remove. An example of this is calcium carbonate. Not wishing to be bound by theory, the phospohonate groups present on the polymers described herein inhibit the crystallization of calcium carbonate and inhibit scale formation and corrosion. If crystal formation does occur, the calcium carbonate crystalline lattice is generally distorted due to the presence of the polymer incorporated within the lattice. This ultimately weakens the crystal lattice (i.e., produces soft scale) and makes removal of calcium carbonate deposits much easier. In this aspect, the polymers described herein can function as hardness stabilizers. Although calcium carbonate is an example of a mineral that can result in scale formation, scale and deposits formed from calcium phosphate, calcium sulfate, calcium phosphonate, and other metal ions (e.g., iron, zinc, magnesium, etc.) can also be inhibited as well.

The presence of the pendant phosphonate groups and the phosphinate backbone provides numerous advantages not attainable with current polymers and methodologies. The pendant phosphonate groups help the polymer bind to metal substrates susceptible to corrosion and the formation of scale. The phosphinate backbone makes the polymer more rigid and prevents the polymer from coiling. Additionally, the phosphinate groups render the polymer more thermally stable, which is important when applied to substrates generally exposed to aqueous environments at elevated temperatures. The rigid polymer backbone also facilitates the binding of the phosphonate groups to the metal substrate. Thus, the combination of phosphonate and phosphinate groups synergistically work together to provide excellent corrosion inhibition characteristics in addition to exhibiting powerful threshold mechanisms that inhibit scale formation.

The polymers can possess other functional groups such as carboxyl, sulfonic acid, amide, etc. groups, which can also be useful in inhibiting scale formation and/or corrosion. For example, sulfonic groups can increase the dispersancy of iron, which can ultimately increase the performance of the polymer by inhibiting iron poisoning. Thus, the polymers described herein can also behave as dispersants and prevent the accumulation of metal ions that can facilitate scale and sludge formation. Additionally, rust formation can be reduced by using the polymers herein as iron dispersants. Polymers containing carboxyl groups are generally good dispersants for calcium carbonate and calcium sulfate. Therefore, in certain aspects, the polymers described herein can display enhanced scale and corrosion prevention by incorporating these groups into the polymers. Incorporation of carboxyl and/or sulfonic groups into the polymers described herein can be accomplished by selecting appropriate monomers bearing these groups.

The polymers can be applied to any system that is subject to scale formation and/or corrosion. Examples of such systems include, but are not limited to, cooling water systems, boiler water systems, steam generating systems, sea-water evaporation equipment, reverse osmosis equipment, paper manufacturing equipment, sugar evaporation equipment, soil irrigation systems, hydrostatic cookers, gas scrubbing systems, closed circuit heating systems, agricultural based refrigeration systems, downhole wall systems, and pulp and paper mill systems.

The polymers can be applied to the systems using techniques known in the art. For example, the polymers can be applied to a substrate by spraying or dipping the substrate with an aqueous solution of the polymer. In this aspect, the polymer produces a protective layer on the surface of the substrate and prevents deposit formation. The polymers can be used in combination with other components to help inhibit scale formation and/or corrosion. Fort example, oxygen scavengers such as, for example, sodium sulfite, can be added to the polymer composition to scavenge oxygen that can contribute to corrosion or pitting problems. In other aspects, filming amines can be used in combination with the polymers to neutralize condensates as they enter the vapor phase. In general, it is not desirable to produce an acidic condensate, which creates dangerous conditions as well as contribute to corrosion and pitting problems.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

Aqueous Polymerization of IPPA/IPPAA Mix

To 45 g of a 29/71 weight ratio of a mixture of isoprepenylphosphonic acid (IPPA) monomer (13.05 g, 0.107 mol)

and isopropenylphosphonic acid anhydride (IPPAA) dimer (31.95 g, 0.141 mol) was added 30 g of water. Here, IPPAA was converted to IPPA monomer in situ. Next, 50% liquid caustic soda (31.2 g, 0.39 mol) was then added over 45 min. while maintaining temperature≦60° C. The resulting solution had a pH of about 4.5 and was heated to 80° C. Sodium persulfate (5.0 g, 0.021 mol) was dissolved in 20 g of water and added over 8 hours while maintaining the temperature at 80-85° C. at all times. Temperature was then raised and held for 1 hour at 85-90° C.

The resulting polymeric solution was cooled down to 25° C. then slowly neutralized, while cooling, with 50% caustic soda (30 g, 0.375 mol) to pH about 8.5. This resulted in the formation of a clear, light amber colored polymer. The conversion of monomer to polymer was determined to be 62 wt. % based upon integration of the area of the peaks in the $^{31}$P NMR spectrum.

Example 2

Aqueous Polymerization of IPPA Monomer 73.8 g of isopropenylphosphonic acid (IPPA) monomer at 64.29% by weight solids (0.39 mol) in water was added to 50% liquid caustic soda (31.2 g, 0.39 mol) over 45 min. while maintaining temperature≦60° C. The resulting solution had a pH of about 4.5 and was heated to 90° C. Sodium persulfate (5.0 g, 0.021 mol) was dissolved in 20 g of water and added over 4 hours while maintaining the temperature at 90-95° C. at all times. Temperature was then raised and held for 1 hour at 100-105° C.

This resulted in the formation of a clear, light amber colored polymer. The conversion of monomer to polymer was determined to be 61.3 wt. % based upon integration of the area of the peaks in the $^{31}$P NMR spectrum.

Example 3

Aqueous Polymerization of IPPA/IPPAA Mix with Sodium Hypophosphite in the Molar Ratio of Monomers to Sodium Hypophosphite of 10.24 to 1

45 g of a 29/71 wt. ratio of a mixture of isopropenylphosphonic acid (IPPA) monomer (0.107 mol) and isopropenylphosphonic acid anhydride (IPPAA) dimer (0.141 mole) was added to 30 g water plus 50% liquid caustic soda (31.2 g, 0.39 mol) over 45 minutes while holding the temperature≦60° C. Sodium hypophosphite (4.05 g, 0.038 mol) was added in one shot and the resulting solution having a pH of about 4.5 was heated to 90° C. Sodium persulfate (5.0 g, 0.021 mol) was dissolved in 20 g of water and the persulfate solution was added over 2 hours while maintaining the temperature of the reaction at 90-95° C. The temperature of the reaction was then raised to 100-105° C. and held for 30 minutes. The resulting clear, amber colored polymeric solution was cooled down to room temperature. The conversion of monomer to polymer was determined to be 83.5% based upon integration of the $^{31}$P NMR spectrum.

Integration of the $^{31}$P NMR Spectrum 38-55 ppm≈10.5% polymer
21-35 ppm≈73.0% polymer
19-20 ppm≈1.5% HEDP
The balance contained other organic and inorganic phosphorus compounds as well as residual monomer.

Example 4

Aqueous Polymerization of IPPA Monomer with Sodium Hypophosphite in the Molar Ratio of Monomers to Sodium Hypophosphite of 10.24 to 1

73.8 g of isopropenylphosphonic acid (IPPA) monomer at 64.29% by weight solids (0.389 mol) in water was added to 50% liquid caustic soda (31.2 g, 0.39 mol) over 45 minutes while holding the temperature≦60° C. Sodium hypophosphite (4.05 g, 0.038 mol) was added in one shot and the resulting solution having a pH of about 4.5 was heated to 90° C. Sodium persulfate (5.0 g, 0.021 mol) was dissolved in 20 g of water and the persulfate solution was added over 2 hours to the solution above while maintaining the temperature of the reaction at 90-95° C. The temperature of the reaction was then raised to 100-105° C. and held for 30 minutes. This resulted in a clear, amber colored polymeric solution. The conversion of monomer to polymer was determined to be 82.9% based upon integration of the $^{31}$P NMR spectrum.

Integration of the $^{31}$P NMR Spectrum 38-55 ppm≈10.2% polymer
21-35 ppm≈72.7% polymer
19-20 ppm≈1.5% HEDP
The balance contained other organic and inorganic phosphorus compounds as well as residual monomer.

Example 5

Aqueous Polymerization of IPPA Monomer with Sodium Hypophosphite in the Molar Ratio of Monomers to Sodium Hypophosphite of 19.45 to 1

77.19 g of aqueous IPPA monomer (61.48%, 0.389 mol) was added to 50% liquid caustic soda (31.2 g, 0.39 mol) over 45 minutes while holding the temperature at≦60° C. Sodium hypophosphite (2.15 g, 0.020 mol) was added in one shot and the resulting solution having a pH of approximately 4.5 was heated to 90° C. Sodium persulfate (5.0 g, 0.021 mol) dissolved in 20 g of water and the resulting persulfate solution was then added to the solution above over 2 hours while maintaining the temperature of the reaction at 90-95° C. Product was then refluxed at 100-105° C. for 30 minutes, which resulted in a clear, amber colored polymeric solution. The conversion of monomer to polymer was determined to be 71.3% based upon integration of the $^{31}$PNMR spectrum.

Integration of the $^{31}$P NMR Spectrum 38-55 ppm≈6.4% polymer
21-35 ppm≈64.9% polymer
19-20 ppm≈1.4% HEDP
The balance contained other organic and inorganic phosphorus compounds as well as residual monomer.

Example 6

In this experiment 50% liquid caustic soda was charged to aqueous IPPA monomer while holding temperature≦60° C. The rest of the experiment was conducted in the same as in Example 4 above. The conversion of monomer to polymer was 82.3% based upon the integration of the $^{31}$PNMR spectrum.

Example 7

Aqueous Polymerization of IPPA/IPPAA Mix with Acrylic Acid and Sodium Hypophosphite in the Molar Ratio of Monomers to Sodium Hypophosphite of 26.8 to 1

To 61 g of a 29/71 wt. ratio of a mixture of IPPA monomer (0.145 mol) and IPPAA dimer (0.191 mol) was added 41 g water. The resulting IPPA monomer solution (102 g) was added over 45 min., while cooling and holding temperature≦60° C., to a solution of 41 g of 50% liquid caustic soda (0.512 mol) and 41 g water. Sodium hypophosphite (6.00 g, 0.057 mol) was added in one shot and the resulting solution with a pH of about 4.0 was heated to 85° C. To this solution was simultaneously added, over a period of 2 hours, (a) a solution of 3.6 g (0.015 mol) of sodium persulfate in 20 g of water and (b) 72 g (1.00 mol) of acrylic acid. Throughout the addition of (a) and (b), the temperature of the reaction was held at 85-95° C. The temperature was then raised to 100-105° C. and held for 30 minutes. The resulting clear, amber colored polymer solution was cooled down to 25° C. Integration of the $^{31}$P NMR spectrum showed 93.7% conversion of the IPPA monomer to polymers with 0.6% HEDP. Residual unreacted monomer accounted for 0.37%. Other organic and inorganic phosphorus compounds added up to 5.35%.

Example 8

Aqueous Polymerization of IPPA/IPPAA Mix with Methacrylic Acid and Sodium Hypophosphite in the Molar Ratio of Monomers to Sodium Hypophosphite of 27.3 to 1

To 61 g of a 29/71 wt. ratio of a mixture of IPPA monomer (0.145 mol) and IPPAA dimer (0.191 mol) was added 60 g water. The resulting IPPA monomer solution (121 g) was added over 45 min., while cooling and holding temperature≦60° C., to a solution of 41 g of 50% liquid caustic soda (0.512 mol) and 41 g water. Sodium hypophosphite (6.00 g, 0.057 mol) was added in one shot and the resulting solution with a pH of about 4.0 was heated to 85° C. To this solution was simultaneously added, over a period of 2 hours, (a) a solution of 3.6 g (0.015 mol) of sodium persulfate in 20 g of water and (b) 86 g (1.00 mol) of methacrylic acid. Throughout the addition of (a) and (b), the temperature of the reaction was held at 90-95° C. The temperature was then raised to 100-105° C. and held for 60 minutes. The resulting clear, amber colored polymer solution was cooled down to 25° C. Integration of the $^{31}$P NMR spectrum showed 87.3% conversion of the IPPA monomer to polymers with 1.3% HEDP. Residual unreacted monomer accounted for 3.1%. Other organic and inorganic phosphorus compounds added up to 8.3%.

Example 9

Aqueous Polymerization of IPPA/IPPAA Mix with Acrylic Acid, 2-acrylamideo-2-methyl propane Sulfonic Acid, Sodium Salt, and Sodium Hypophosphite in the Molar Ratio of Monomers to Sodium Hypophosphite of 29 to 1

To 61 g of a 29/71 wt. ratio of IPPA/IPPAA mix was added 100 g of water, then 50% liquid caustic soda (41 g, 0.512 mol) was added over 45 min. while holding temperature≦60° C. Sodium hypophosphite (7.43 g, 0.07 mol) was added in one shot and the resulting solution was heated to 90° C. To this solution was simultaneously added, over a period of 3 hours, (a) a solution of 18.6 g (0.078 mol) of sodium persulfate in 105 g of water and (b) 72 g (1.00 mol) of acrylic acid and (c) 229 g (0.50 mol) of 50% liquid 2-acrylamido-2-methylpropane sulfonic acid, sodium salt. Throughout the addition of (a), (b) and (c), the temperature of the reaction was held at 90-95° C. The reaction mixture was heated for a further 2 hours at reflux. The resulting clear, amber colored polymer solution weighed 625 g with a solids content of 45.4%. The conversion of IPPA/IPPAA mix (and/or 100% IPPA monomer) to polymer was determined to be about 94% based upon integration of the $^{31}$P NMR spectrum.

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A polymer produced by the process comprising polymerizing a monomer comprising the formula I, a dimer comprising the formula IV, or a combination thereof

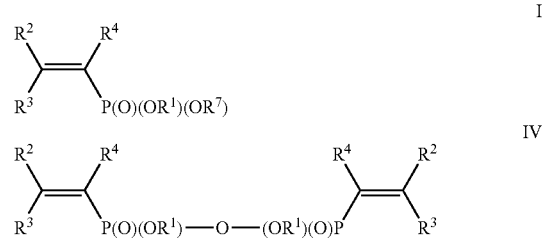

wherein $R^1$-$R^4$ and $R^7$ comprises, independently, hydrogen, an alkyl group, a cycloalkyl group, a heteroalkyl group, a heterocycloalkyl group, an aryl group, a heteroaryl group, a protecting group, or a combination thereof, or $R^2$ and $R^4$ form a substituted or unsubstituted cycloalkyl group, with hypophosphorous acid, an alkali metal hypophosphite, an alkyl substituted hypophosphite, or any combination thereof.

2. The polymer of claim 1, wherein $R^2$ and $R^3$ comprises hydrogen.

3. The polymer of claim 2, wherein $R^1$ and $R^7$ are hydrogen.

4. The polymer of claim 3, wherein $R^4$ comprises an aryl group or a heteroaryl group.

5. The polymer of claim 3, wherein $R^4$ comprises a substituted or unsubstituted phenyl group or a substituted or unsubstituted benzyl group.

6. The polymer of claim 3, wherein $R^4$ comprises $CH_2C_6H_4$-p-$S(O)_2OH$ or an alkali salt thereof.

7. The polymer of claim 1, wherein $R^1$-$R^4$ and $R^7$ are hydrogen.

8. The polymer of claim 7, wherein $R^4$ comprises an alkyl group.

9. The polymer of claim 8, wherein the alkyl group comprises methyl, ethyl, propyl, isopropyl, butyl, isobutyl, pentyl, or hexyl.

10. The polymer of claim 7, wherein $R^4$ comprises a cycloalkyl group, and the cycloalkyl group comprises cyclopropyl, cyclobutyl, cyclopentyl, or cyclohexyl.

11. The polymer of claim 1, wherein the cycloalkyl group comprises cyclopropyl, cyclobutyl, cyclopentyl, or cyclohexyl.

12. The polymer of claim 1, wherein $R^4$ comprises a higher alkyl group.

13. The polymer of claim 12, wherein the higher alkyl group comprises heptyl, octyl, decyl, tetradecyl, hexadecyl, eicosyl, or tetracosyl.

14. The polymer of claim 1, wherein at least one of $R^2$, $R^3$, or $R^4$ comprises a higher alkyl group, a cycloalkyl group, a heterocycloalkyl group, a heteroaryl group, a protecting group, or an aryl group substituted with one or more $SO_2R$ or $S(O)_2OR$ groups, where R is hydrogen, an alkali metal, or an alkyl group.

15. The polymer of claim 1, wherein the polymer comprises the polymerization product of two or more different monomers comprising the formula I.

16. The polymer of claim 1, wherein the polymer comprises the polymerization product between at least one monomer having the formula I and one or more olefinically unsaturated monomers.

17. The polymer of claim 16, wherein the olefinically unsaturated monomer comprises acrylic acid, methacrylic acid, acrylamide, methyl methacrylate, ethyl acrylate, 2-hydroxy ethyl acrylate, 2-hydroxy propyl acrylate, maleic acid, maleic anhydride, t-butylacrylamide, vinyl sulfonic acid, 2-acrylamido-2-methyl propane sulfonic acid (AMPS), styrene sulfonic acid or sodium salt thereof, vinyl acetate, styrene acetate, styrene benzoic acid, vinyl cyclopropane, vinyl cyclopentane, sodium vinyl sulfonate, vinyl cyclohexane, or any combination thereof.

18. The polymer of claim 1, wherein the alkali metal hypophosphite comprises sodium hypophosphite.

19. The polymer of claim 1, wherein the molar ratio of hypophosphorous acid, the alkali metal hypophosphite, or a combination thereof per monomer is from 1:5 to 1:50.

20. The polymer of claim 1, wherein the molar ratio of hypophosphorous acid, the alkali metal hypophosphite, or a combination thereof per monomer is from 1:5 to 1:25.

21. The polymer of claim 1, wherein the polymer comprises the polymerization product between at least one monomer having the formula I and at least one cyclic vinyl phosphonic acid or ester thereof.

22. A method for producing a polymer comprising polymerizing a monomer comprising the formula I, a dimer comprising the formula IV, or a combination thereof

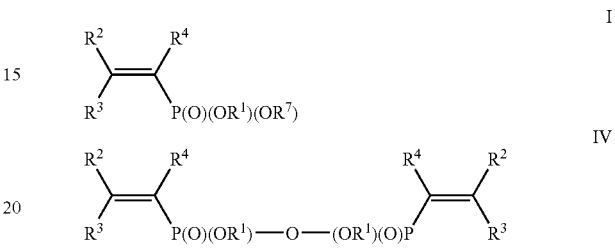

wherein $R^1$-$R^4$ and $R^7$ comprises, independently, hydrogen, an alkyl group, a cycloalkyl group, a heteroalkyl group, a heterocycloalkyl group, an aryl group, a heteroaryl group, a protecting group, or a combination thereof, or $R^2$ and $R^4$ form a substituted or unsubstituted cycloalkyl group, with hypophosphorous acid, an alkali metal hypophosphite, or a combination thereof.

23. A method for inhibiting scale formation in a system comprising applying to the system the polymer of claim 1.

24. A method for inhibiting corrosion in a system comprising applying to the system the polymer of claim 1.

25. A method for inhibiting corrosion and scale formation in a system comprising applying to the system the polymer of claim 1.

* * * * *